Oct. 9, 1962   L. J. CHAMBON   3,057,241
FLAT-RIB TYPE CUTTING PRESS
Filed Feb. 3, 1959   3 Sheets-Sheet 1

Oct. 9, 1962 L. J. CHAMBON 3,057,241
FLAT-RIB TYPE CUTTING PRESS
Filed Feb. 3, 1959 3 Sheets-Sheet 3

United States Patent Office 3,057,241
Patented Oct. 9, 1962

3,057,241
FLAT-RIB TYPE CUTTING PRESS
Louis Jean Chambon, Paris, France, assignor to Societe d'Etudes de Machines Speciales, Société Anonyme, Paris, France
Filed Feb. 3, 1959, Ser. No. 790,945
Claims priority, application France Feb. 20, 1958
2 Claims. (Cl. 83—510)

This invention relates to a press for cutting out, pinking or notching sheet material, wherein the sheet material is pressed against a flat support carrying the cutting tool of the so-called "rib" type, by a swinging table having a cylindrical operative surface adapted to roll without sliding on the plane in which the sheet is held.

When the table rolls on the plane of the sheet it bears thereagainst with only one generatrix at any moment, so that the cutting operation may be effected by using stresses definitely lower than those usually employed in known flat-working presses. The machine of this invention is furthermore characterized by a comparatively lower weight.

This invention is concerned more particularly with a machine for manufacturing cardboard blanks and its object consists in providing a machine adapted to exert relatively high pressures.

To this end, the machine according to this invention is a flat-cutting press comprising a fixed support on which a cutting tool of the flat rib or thread type, a swinging table having a cylindrical surface of relatively great radius of which the axis is not materialized, and means for causing said swinging table to roll without sliding on said rib cutting tool and for lowering the table upon completion of the cutting part of the cycle of operation to permit the insertion of a fresh sheet of material to be cut.

The means for causing the swingable table to roll without sliding on the cutting tool may consist preferably of links having one end pivoted on the table and the other end pivoted on oscillatable levers pivoted in turn about their axes under the control of rotary cams driven continuously and shaped to impart a rolling motion to the table.

Adequate means for guiding the swinging table may be provided in order to cause it to roll without sliding. These means consist, for example, of rollers carried by said table and in rolling engagement with cycloid ramps.

These guide means may also consist of toothed sectors fixed to the swinging table and having their pitch radius equal to the radius of the cylindrical surface of the table. The toothed sectors mesh with stationary rectilinear racks parallel to the plane of the sheet material to be cut.

The over-all dimensions of the machine of this invention are reduced considerably in comparison with similar known arrangements, because the axis of the cylindrical surface of the table plays no part in the operation of the cutting mechanism and therefore needs not be fixed.

On the other hand, the support carrying the cutting tool on its lower face is fixed since the sheet material is released by lowering the swinging table, and may be disassembled very rapidly as it is not connected to any moving parts or mechanism.

In order to afford a clearer understanding of the invention and of the manner in which the same may be carried out in practice, reference will now be made to the attached drawings forming part of this specification and illustrating diagrammatically by way of example two typical forms of embodiment of the invention. In the drawings.

Figure 1:
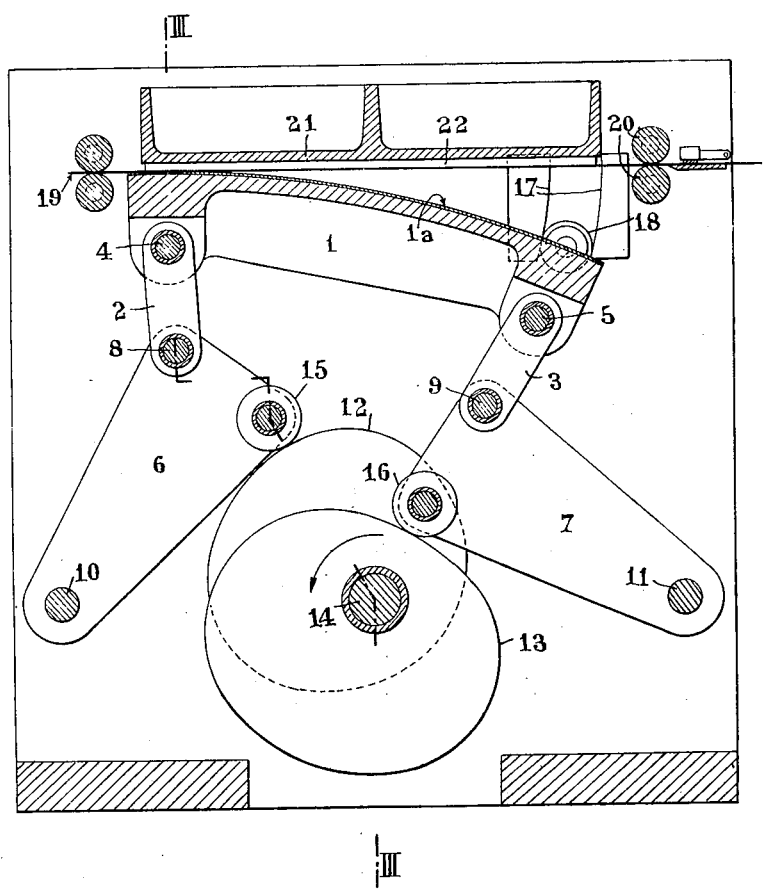
FIGURE 1 is a longitudinal section showing the machine with the swinging table in its operative position.

The table 1 comprises a cylindrical working surface 1a of relatively large radius supported by links 2, 3 pivoted on the one hand on the table proper by means of pins 4, 5 and on the other hand on rockable levers 6, 7 by means of pins 8, 9. These levers 6, 7 are fulcrumed in turn on fixed pins 10, 11 and bear respectively through cam followers or rollers 15, 16 on a pair of cams 12, 13 driven for continuous rotation by a shaft 14.

These cams are each provided with a suitably shaped peripheral surfaces or profiles whereby out-of-phase oscillating or swinging movements of both levers 6, 7 are controlled to impart a rolling motion to the table 1 such that the circular contour 1a thereof will constantly be tangential to the plane of the sheet material to be cut.

A pair of ramps 17 secured to the frame structure of the machine and engaged by rollers 18 carried by the table 1 are so shaped that when the shaft 14 is rotated the table 1 is caused to roll without sliding on the plane of the material 19 to be cut. The material 19 is fed to the cutting position by feed rollers 20.

Overlying the plane of the sheet material 19 to be cut is a fixed support 21 having secured on its lower face a flat cutting tool 22 of the rib or thread type coincident with this plane.

The operation of the machine of this invention is very simple.

In FIGURE 1, the table 1 is in the position corresponding to the beginning of its cutting operation; the sheet material 19 has previously been secured in its plane and the cutting work by the application of pressure begins.

The pressure exerted by virtue of the suitably shaped cams 12, 13 causes all the points of the sheet material 19 to be pressed successively against the tool ribs or threads 22, and the cutting operation is completed when all the points of the cylindrical surface 1a have contacted the plane of these ribs or threads and when the end of the curved surface which is opposite to the one shown in engagement with the material in FIG. 1 has also been pressed against this material.

Figure 2:
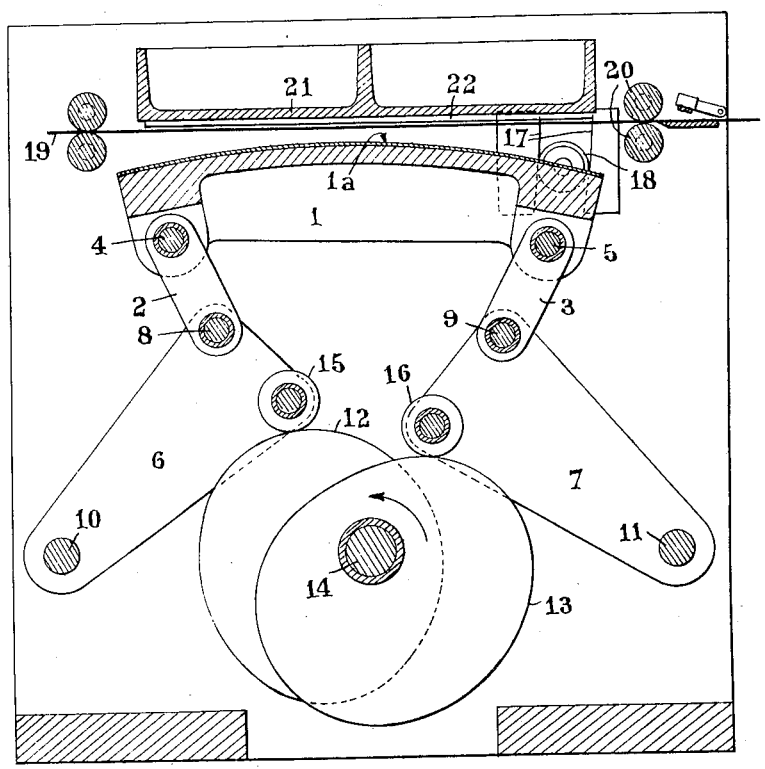
FIGURE 2 is a longitudinal section similar to FIG. 1 but showing the table in its lowermost position.
Figure 3:
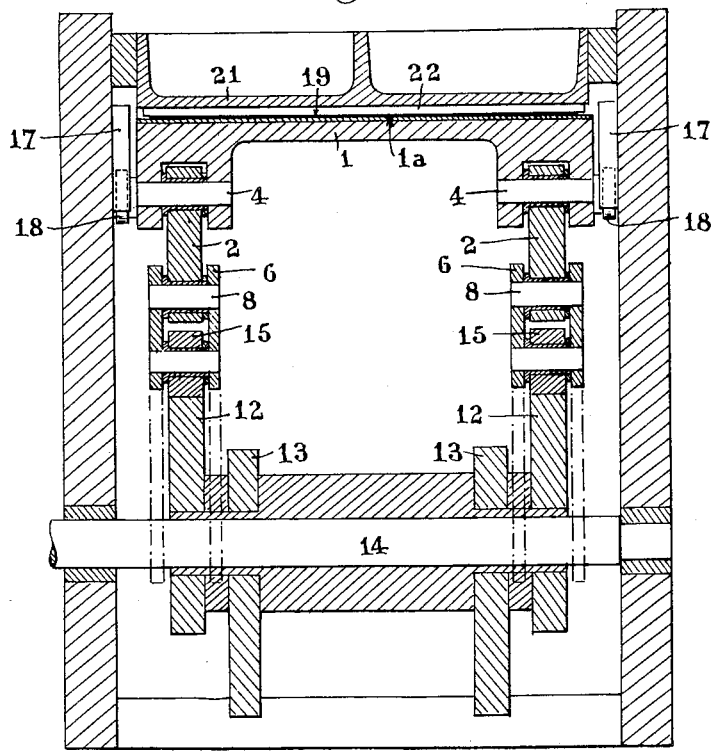
FIGURE 3 is a cross-section taken on the line III—III of FIG. 1.

Generally, the cutting operation proper is completed after the cams have been rotated through a half-revolution, or slightly more or less than this angle, the remaining portion of the revolution is used for returning the swinging table to its initial position in which it is somewhat spaced from the sheet material. The table is maintained in this position (FIG. 2) during a time sufficient to enable the operator to remove the cut material and substitute a fresh sheet of material for the cut one, the same sequence of operations being resumed as the cam rotation is continued.

Figure 4:
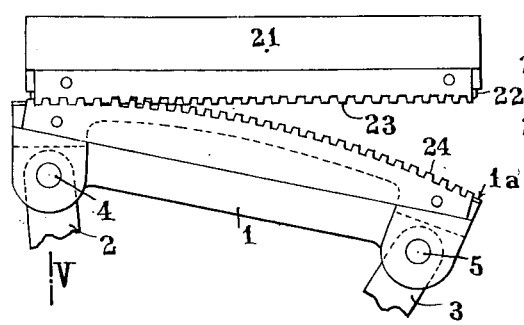
FIGURE 4 is a longitudinal fragmentary sectional view showing a modified form of embodiment of the swinging table guide means.
Figure 5:
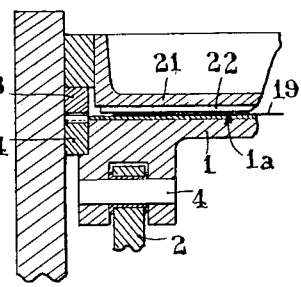
FIGURE 5 is a fragmentary cross-sectional view taken on the line V—V of FIG. 4.

According to a modified form of embodiment of the machine, the swinging table may be caused to roll without sliding on the sheet material pressed against the support 21 by providing suitable straight racks 23 (FIGS. 4 and 5) in meshing engagement with toothed sectors 24 rigid with the table 1 and having a pitch radius equal to the radius of the cylindrical surface of this table. In this case, the guide ramps 17 may be dispensed with.

The two forms of mechanisms have been described for it is advantageous, when sheet material of relatively large dimensions is to be cut, to use a curved surface 1a of great length, in order to limit the amplitude of the swinging movement and the corresponding forces of inertia, so that the machine may operate at a higher speed, particularly when light materials are to be cut.

In the case of a table having a relatively great radius, it may be difficult to machine the teeth of the toothed sectors; in this case, the ramp system 17 may be preferred.

Of course, many details, relative proportions and arrangements of parts may be modified in the forms of embodiment shown and described herein by way of example, but provided that the basic principle of the invention is adhered to according to the appended claims, this would not constitute a departure from the present invention.

What I claim is:

1. In a flat-rib type cutting press, in combination, a fixed flat support, a flat-ribbed cutting tool mounted on said fixed support, a swingable table swingable about an axis lowerable to a lowered position and positionable in a raised position, said table having an arcuate operative surface of relative large radius and cyclically operable from a lowered position to a raised condition for cooperating with said tool for cutting sheet material thereon, means operably connected to said table for cyclically effecting an operating stroke and raising said axis for raising said table from said lowered position and for causing said table operative surface to roll on said flat-ribbed cutting tool while said table is in its raised position and for lowering the table axis away from said cutting tool and effecting a return stroke of said table while the same is in its lowered position thereby to permit insertion of sheet material during said return stroke into position for cutting by said tool, said means comprising a pair of oscillatable levers pivotally mounted, two links each pivotally connected to a respective one of said levers and pivotally connected adjacent to opposite ends of said table, and for each lever a driven cam cooperative therewith having camming surfaces for reciprocably oscillating said levers in timed out-of-phase relationship to cause said table surface to roll on said cutting tool without slippage and lower said table axis on said return stroke.

2. In a flat-rib type cutting press in combination, a fixed flat support, a flat-ribbed cutting tool mounted on said fixed support, a swingable table swingable about an axis lowerable to a lowered position and positionable in a raised position, said table having an arcuate operative surface of relative large radius and cyclically operable from a lowered position to a raised condition for cooperating with said tool for cutting sheet material thereon, means operably connected to said table for cyclically effecting an operating stroke and raising said axis for raising said table from said lowered position and for causing said table operative surface to roll on said flat-ribbed cutting tool while said table is in its raised position and for lowering the table axis away from said cutting tool and effecting a return stroke of said table while the same is in its lowered position thereby to permit insertion of sheet material during said return stroke into position for cutting by said tool, said means comprising a pair of oscillatable levers pivotally mounted, two links each pivotally connected to a respective one of said levers and pivotally connected adjacent to opposite ends of said table, for each lever a driven cam cooperative therewith having camming surfaces for reciprocably oscillating said levers in timed out-of-phase relationship to cause said table surface to roll on said cutting tool without slippage and lower said table axis on said return stroke, means cooperative with said table for insuring said table operative surface is rolled on said cutting tool without slippage, the last-mentioned means comprising at least one roller on said table, and fixed ramps defining a guide path having a cycloidal configuration for guiding travel of said roller during swinging movement of said table.

References Cited in the file of this patent

UNITED STATES PATENTS

| | | |
|---|---|---|
| 1,487,219 | Dreis | Mar. 18, 1924 |
| 2,130,818 | Soderberg | Sept. 20, 1938 |
| 2,733,766 | Wikle | Feb. 7, 1956 |
| 2,737,238 | Rowlands | Mar. 6, 1956 |
| 2,776,610 | Roselius | Jan. 8, 1957 |

FOREIGN PATENTS

| | | |
|---|---|---|
| 110,224 | Germany | Apr. 30, 1900 |
| 176,499 | Germany | Oct. 13, 1906 |
| 908,473 | France | Apr. 10, 1946 |